Jan. 16, 1968  R. L. FROEBE  3,364,454

VARIABLE RESISTANCE DEVICE

Filed June 22, 1965

INVENTOR.
RONALD L. FROEBE
BY
Gerd L. Mehlhoff
ATTORNEY

United States Patent Office 3,364,454
Patented Jan. 16, 1968

3,364,454
VARIABLE RESISTANCE DEVICE
Ronald L. Froebe, Buena Park, Calif., assignor to Beckman Instruments, Inc., a corporation of California
Filed June 22, 1965, Ser. No. 465,900
4 Claims. (Cl. 338—176)

ABSTRACT OF THE DISCLOSURE

A translational linear motion variable resistance device having a reciprocal shaft extending through an end wall of a housing encompassing a resistance element. The end of the shaft within the housing is attached to a contact carrier block, by means of an improved pivotal arrangement permitting lateral movement of the shaft without relative movement of the contact carrier block. The shaft opening through the housing is provided with sealing means comprising an annular ring of elastomeric material disposed within an annular gland formed in an end of the housing and including a pair of flat washers also disposed around the shaft around the opposite sides of the ring with the surfaces of the washers adapted to move in mutually contacting engagement with the sides of the gland.

---

The present invention relates to variable resistance devices such as potentiometers, rheostats and the like which have a movable electrical contact adapted to traverse a resistance element, and is more particularly directed to such devices in which the contact is moved in a translatory type motion.

In linear or translatory motion variable resistance devices, a contact carrier block, which supports the electrically conductive wiper, is normally attached to a control or adjustment shaft that extends through a hole formed in the housing of the device. The end of the shaft is, in turn, engaged by a reciprocating device adapted to adjust the position of the contact carrier block and its associated contact within the housing. Movement of the control shaft adjusts the position of the wiper contact with respect to a resistance element. When the control shaft is attached directly to the contact carrier block, any lateral movement or rotational movement of the end of the shaft, due to misalignment of the reciprocating member with the variable resistance device, causes a certain amount of variation from the translational movement of the carrier block and its attached wiper resulting in inaccuracies. The lateral movement or rotational motion of the shaft also may cause differences in wiper contact pressure on the resistance element. Due to such conditions the performance of the device may be impaired and the resulting uneven wear of the wiper contact on resistance element tends to shorten the service life of the device.

In order to accommodate a small amount of shaft misalignment, linear motion variable resistance devices of the past have employed a shaft sealing system around the shaft at the shaft opening using an O-ring with a certain amount of "give" which permits small amounts of lateral displacement of the shaft without too greatly affecting the position of the carrier block. This arrangement, however, only permits slight shaft misalignments and, when the permissible amount is exceeded, the O-ring tends to become torn or rolled completely out of its seat.

It is an object of the present invention to provide a new and improved shaft sealing arrangement for a translationally operated variable resistance device.

It is a further object of the present invention to provide a shaft sealing ring arrangement which is capable of maintaining a suitable seal despite substantial shaft misalignment.

It is another object of the present invention to provide an improved arrangement for ataching the shaft to the carrier block in a translatory motion variable resistance device.

Further objects and advantages of the invention will become apparent as the following description proceeds, and the features of novelty which characterize the invention will be pointed out with particularity in the claims annexed to and forming a part of this specification.

In accordance with the present invention, there is provided a variable resistance device including a housing defining a cavity in which is mounted a resistance element and a carrier block, carrying an electrically conductive wiper, and adapted for reciprocation in a path parallel to the resistance element. Extending through an opening in the housing is an adjustment shaft and means are provided for connecting the carrier block to one end of the shaft so that the conductive wiper may be positioned by external means attached to the shaft. In order to seal the opening and permit slight misalignment of the shaft there is provided a sealing means in the form of a resilient ring of elastomeric material disposed around the shaft and a pair of flat washers arranged on opposite sides of the ring around the shaft. The washers and sealing ring are positioned within an annular gland formed in the housing around the opening through which the shaft extends, the gland permitting lateral movement of the ring and washers during lateral movement of the shaft.

As a further aspect of the invention, means are provided for connecting the end of the shaft to the contact carrier block in a manner to permit rotational and pivotable movement of the shaft in any direction without substantially changing the orientation of the carrier block and its associated wiper with respect to the resistance element or causing the carrier block to bind in its supporting means.

For a better understanding of the invention, reference may be had to the accompanying drawing in which FIGURE 1 is a side elevation view taken in cross-section of a preferred embodiment of the invention;

Figure 1:
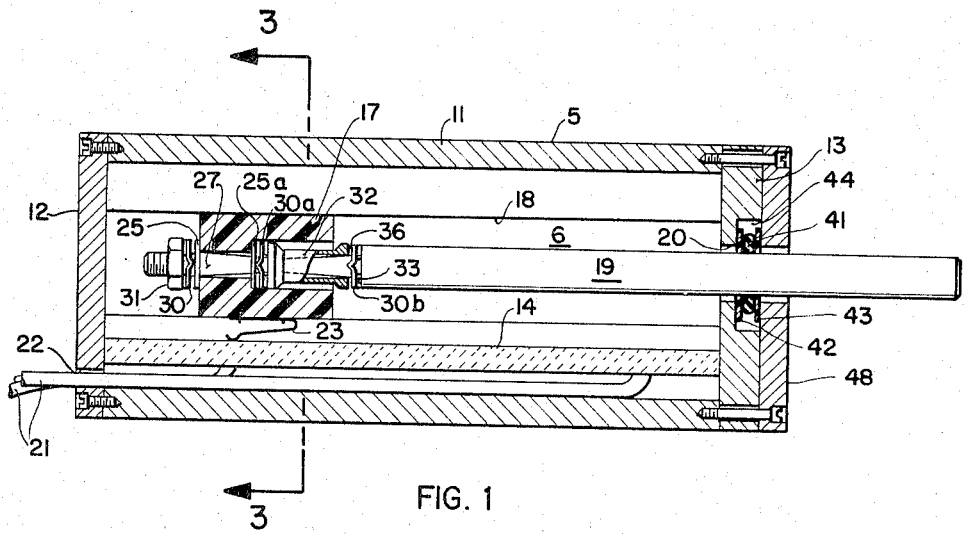

Referring now to the drawings, there is shown a preferred embodiment of the invention. As will be seen in FIGURE 1, the translatory motion variable resistance device comprises a housing 5 defining a cavity 6. In the illustrated embodiment of the invention, the housing comprises a cylindrical body 11 and a pair of end walls 12 and 13 which are attached to and enclose the opposite ends of the cylindrical housing. The housing may be formed of aluminum, or plastic, such as diallyl phthalate or the like, and the end walls may be formed of the same material. While the housing in the illustrated embodiment is cylindrical in shape, it may be formed in any desired shape such as rectangular or square.

Figure 3:
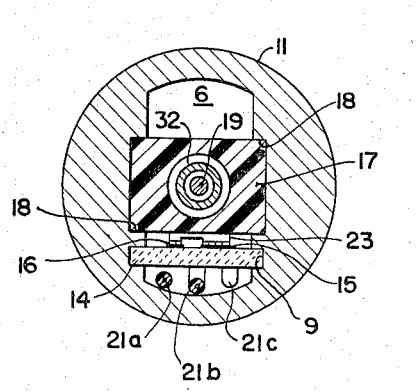
FIGURE 3 is a cross sectional view taken substantially along line 3—3 of FIGURE 1.

Securely mounted within the housing 11, is a non-conductive base member 14 formed of alumina or steatite or plastic upon which, as may best be seen in FIG. 3, are mounted a resistance element 15 and a conductive collector strip 16. The resistance element 15 is preferably formed of a deposited film of resistance material, such as a cermet resistance material, conductive plastic resistance material or metallic film material. The resistance element can also be formed of a wire wound resistance element attached to the substrate base member or disposed in suitable grooves formed therein. The conductive strip may be formed of a suitable conductive material such as silver-palladium film or may comprise a continuous strip of conductive wire.

Attached to the end of the resistance element 15 are terminals (not shown) which may be, in turn, connected to a source of electrical potential in an electrical circuit. For this purpose, there are provided a plurality of conductor leads 21a, 21b, and 21c extending through an opening 22 formed in the end wall 12 of the housing. The insulated conductor leads are adapted for connection into an external electrical circuit and are attached respectively, through suitable terminals passing through the base member, to the opposite ends of the resistance element 15 and to the conductive collector bar 16 arranged on the substrate 14. Suitable terminals, adapted for this purpose, are disclosed in the patent of K. F. Miller et al., Patent No. 3,134,085 and the co-pending application of Karl Szobonya Ser. No. 416,074, both of which are assigned to Beckman Instruments, Inc., assignee of the present invention.

In the embodiment disclosed, the base member 14 is disposed in suitable slots 9 formed in the sidewalls of the cylindrical body 11 and is arranged substantially parallel with the longitudinal length of the cylindrical member.

Also mounted within the housing for reciprocation in a path parallel to the surface of the base member 14 and its associated resistance element 15, is a contact carrier block 17. As may be seen best in FIG. 3, the contact carrier block 17 is supported by means such as the grooves or slotted sidewall sections 18 of the housing which guide the contact carrier block in a parallel path over the resistance element.

In order to reciprocate the contact carrier block back and forth over the resistance element, there is provided an adjustment rod or control shaft 19 which extends through an opening, generally designated by the reference numeral 20, formed in the end wall 13 of the housing. Shaft 19 is adapted for reciprocable movement through the opening 20. One end of the shaft 19 is connected to the contact carrier block 17 and the other end extends through the opening 20 to be actuated by an adjustment means or member (not shown) which may be mounted externally of the housing.

Attached directly to the lower surface of the contact carrier block 17 is a conductive wiper or slider 23 having a plurality of fingers or resilient conductive members extending downwardly therefrom across the space between the carrier block and the resistance element to engage the surface of the resistance element and the surface of the conductive collector bar 16. Through means of the conductive wiper, electrical connection is made between the resistance element 15 and the conductive strip at any of an infinite number of positions along the length of the resistance element.

Movement of the control shaft 19 slides the wiper 23 along the resistance element 15 so that the desired portion of the potential, which may be applied to the resistance element 15 by leads 21, is selected and applied across the lead 21a attached to the collector bar and one or the other of the leads 21b or 21c connecting with the resistance element. The carrier block 17, as may best be seen in FIGURE 3, is precluded from unwanted movement in a direction normal to the translational axis by the slots 18 formed in the housing.

Figure 5:
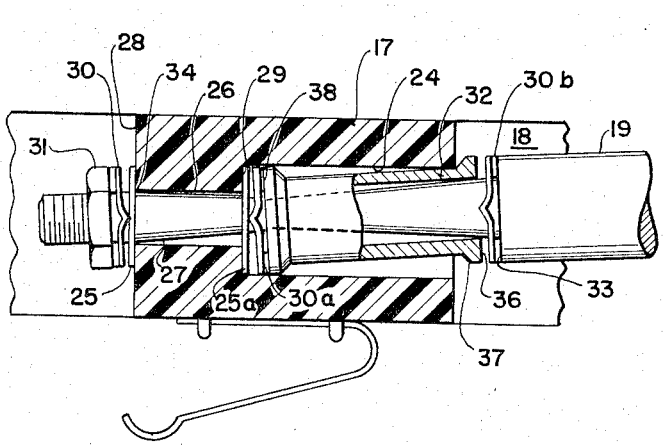
FIGURE 5 is an enlarged view of the carrier block assembly and the pivot attachment means for the end of the shaft.

As may be seen in FIGURE 5, the carrier block is attached to the end of the shaft 19 by a pivot attachment means which forms essentially a universal joint. The carrier block is provided with a pair of concentric bores 24 and 26 arranged coaxially with respect to the block and each other. Bore 26 is substantially smaller than bore 24. The shaft 19 is provided with a turned down end section 27 adapted to extend through the small bore 26.

Figure 4:
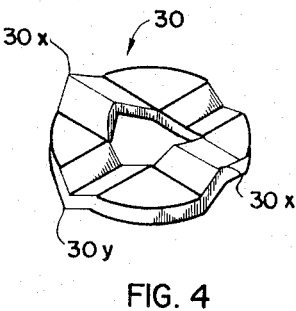
FIGURE 4 is a perspective view of a pivot washer used in connecting the end of the shaft to the carrier block.

Pivot means are provided for connecting the end 27 of the shaft to the carrier block 17 so that the shaft 19 can pivot or rotate without disturbing the position of the wiper 23. However, when appropriate motion is applied, the wiper 23 is positively actuated across the resistance element 15. The pivot means include a pair of flat washers 25 and 25a positioned respectively against the front surface 28 of the carrier block and against the shoulder or surface 29 formed between the small bore 26 and the large bore 24. In order to permit the shaft to pivot, yet provide direct axial connection to the carrier block, there are provided, in abutting relationship to the flat washers 25 and 25a a pair of pivot washers (generally designated by the reference numeral 30) which are formed into a configuration substantially as shown in FIGURE 4. Pivot washers 30 have diametrically disposed protruding line contact regions or edges 30x and 30y adapted to abut the flat surfaces of the washer and other flat surfaces on the opposite sides thereof. The pivot washers 30 permit the shaft 19 to pivot around such line pivot regions substantially in the same manner as a universal joint.

The front pivot washer is retained in place on the end of the shaft 27 by means of a nut 31 adapted to be turned onto a threaded end portion of the shaft. Immediately adjacent the pivot washer 30a is a spool member 32 having an end surface 38 adapted to abut against one pivot side or line of the washer 30a. The spool 32 extends over a relieved section on the forward end of the shaft. The opposite end surface 36 of the spool abuts against a third pivot washer 30b disposed immediately between the spool 32 and a shoulder 33 formed on the shaft. The pivot washer 30b permits the spool 32 to tilt into position around the relieved portion of the forward end of the shaft as the misalignment of the shaft 19 increases or decreases as it is reciprocated back and forth through the opening in the housing. It will be understood that, while the pivoting is shown in only one direction the arrangement of the pivot washers with oppositely disposed pivot axes or lines, permits the shaft 19 to pivot in both vertical and horizontal directions or combinations of both.

A typical pivot washer 30 may be fabricated from a rigid material such as stainless steel. The pivot washers 30 help to reduce undesired effects which occur when the control shaft 19 is rotating and translating at the same time. The flat washers 25 and 25a provide bearing surfaces where needed for the pivot washers 30 and 30a. The spool-shaped sleeve 32 serves to reduce the friction between the shaft 19 and the carrier block 17 due to any shaft misalignment. In order to prevent the end of the shaft from sliding up and down adjacent the end or surface 28 of the carrier block, the shaft diameter at point 34 is made with a minimum clearance with the diameter of the smaller bore 26. This permits the shaft to be pivoted around the point 34, yet prevents the shaft from sliding laterally with respect to the carrier block. Clearance is provided in the remaining portion of the forward end 27 of the shaft to permit the pivoting of the shaft within the area defined within the bores 24 and 26 of the carrier block.

As may be seen in FIGURE 5, the inner diameter of the hole through the spool at the spool end surface 36 is substantially the same diameter as the inner outer diameter of the relieved portion of the shaft so that the spool rides directly on this portion of the forward end 27 of the shaft. Thus, the spool 32 adjacent the shoulder 33 of the shaft rides directly on the relieved portion 27 of the shaft 19 and pivots therewith. Between points 34 and 36 the shaft is relieved and reduces to a minimum in the region of the end surface 38 of this spool. The diameter of the spool adjacent the end surface 38 is substantially that of the larger bore 24 with a small clearance to permit insertion of the spool. Thus, the forward end of the spool is retained substantially in position within the bore 24 but permitted to pivot with the shaft due to its contact with the shaft adjacent the end surface 36.

While the carrier block 17 is shown having a length substantially sufficient to encompass most of the spool 32, it will be obvious that the length of the carrier block may be substantially reduced and the length of the bore 24 reduced so that the spool extends a distance out of the carriage block. However in order to reduce the effect of any forces on the carriage block, it is desirable to make it as long as possible and, thus, it is shown substantially encompassing the entire spool 32.

Figure 2:
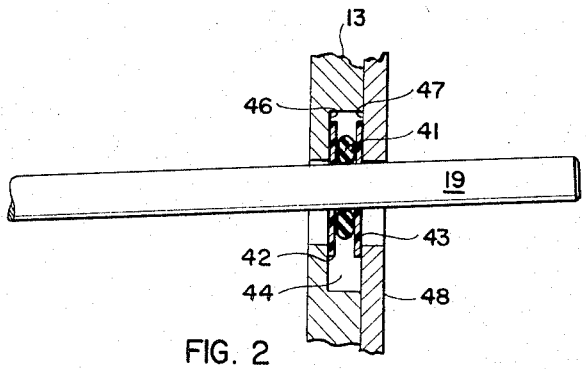
FIGURE 2 is an enlarged cross-sectional view of the shaft sealing arrangement.

Referring now to FIGS. 1 and 2, in order to maintain an adequate seal between the shaft 19 and the opening 20 through the end wall 13 of the housing, there is provided a resilient O-ring 41 of elastomeric material around the shaft 19. The O-ring 41 is sandwiched between two flat washers 42 and 43 disposed on opposite sides of the O-ring and positioned around the shaft 19. When the shaft 19 is moved radially with respect to its axis, the washers 42 and 43 are forced to follow and the O-ring 41 as it moves with the shaft. The washers 42 and 43 act essentially as a movable extension of the walls of the annular gland 44 formed in the end wall 13 of the housing. As will be seen in FIGURE 2 the resilient O-ring is retained tightly around the shaft and between the inner surfaces of the washers 42 and 43, while the outer surfaces of the washer ride smoothly against the flat surfaces 46 and 47 of the annular gland 44. The washers 42 and 43 prevent the O-ring 41 from rolling out of the space in the opening 20 during translational movement of the shaft 19. The seal achieved is limited generally by the seal between the O-ring and respective surfaces of the washers 42 and 43 and the walls 46 and 47 of the gland 44. Therefore, the mutually contacting sides of the washers 42 and 43 and gland surfaces 46 and 47 should preferably be quite smooth and flat. In the embodiment illustrated the gland is formed by an annular bore or countersunk portion in the end wall 13 which is covered by a cover plate 48 disposed over the end wall 13 and forming a part thereof. The washers 42 and 43 are typically of a material, such as polytetrafluoroethylene and the O-ring 41 may be of an elastomeric material, such as silicon rubber or the like.

By means of the present invention it is possible to have a certain amount of misalignment between the shaft operating means attached to the end of the shaft 19 and the connection to the carrier block 17 and still not affect the operation of the carrier block or make the shaft bind during translational movement of the shaft. This permits the variable resistance device to be attached into position in substantially linearly alignment with respect to the operating member without necessarily requiring precise alignment between the operating member and opening 20 in the housing through which the shaft is reciprocated.

While in accordance with the patent statutes there has been shown and described what at present is considered to be the preferred embodiment of this invention, it will be obvious to those skilled in the art that various changes and modifications may be made therein without departing from the invention and it is, therefore, the intent of the appended claims to cover all such changes and modifications as fall within the true spirit and scope of the invention.

What is claimed is:
1. A variable resistance device comprising:
   a housing having sidewalls enclosing a cavity, said housing having a shaft opening in a sidewall thereof communicating with said cavity;
   a resistance element supported within said cavity;
   a contact carrier block mounted in said cavity for reciprocation in a path substantially parallel to said resistance element, said contact carrier block including an electrically conductive wiper extending to and adapted to traverse said resistance element;
   an adjustment shaft extending through said shaft opening in said housing;
   sealing means within said opening in said housing for sealing said opening between said shaft and said housing;
   pivot means for pivotally attaching said shaft to said contact carrier block, said pivot means comprising:
      a bore formed in said carrier block coaxially with respect to said direction of reciprocation thereof, said bore having dimensions substantially greater than the diameter of said shaft and adapted to receive one end of said shaft therethrough;
      at least one pair of pivot washers disposed on said end of said shaft on opposite sides of said bore through said carrier block and retaining said carrier block therebetween, said pivot washers each having pivot edges protruding from opposite sides thereof, said pivot edges being disposed substantially normal to each other on opposite sides of said respective washer thereby permitting said shaft to pivot in any direction without producing a lateral binding force on said contact carrier block; and
      means abutting said pivot washers and preventing axial movement thereof with respect to said shaft so that said carrier block positioned between said pivot washers is reciprocated by corresponding movement of said shaft.

2. A variable resistance device comprising:
   a housing having sidewalls enclosing a cavity, said housing having a shaft opening in a sidewall thereof communicating with said cavity;
   a resistance element supported within said cavity;
   a contact carrier block mounted in said cavity for reciprocation in a path substantially parallel to said resistance element, said contact carrier block including an electrically conductive wiper extending to and adapted to traverse said resistance element;
   an adjustment shaft extending through said shaft opening in said housing, said shaft having one end portion thereof within said housing relieved to provide a smaller cross-section than the remaining portion thereof;
   sealing means within said opening in said housing for sealing said opening between said shaft and said housing;
   pivot means for pivotally attaching said shaft to said contact carrier block, said pivot means comprising:
      a first bore formed in said carrier block coaxially with respect to said direction of reciprocation, said first bore adapted to receive the relieved end portion of said shaft therethrough;
      a second substantially larger bore coaxially aligned with said first bore formed through a portion of said contact carrier block and forming a shoulder surface between said respective concentric bores;
      a pair of pivot washers disposed on opposite sides of first bore around said end portion of said shaft extending therethrough and retaining said carrier block therebetween, said pivot washers each having pivot edges protruding from opposite sides thereof, said pivot edges being disposed substantially normal to each other on opposite sides of said respective washer thereby permitting said shaft to pivot in any direction without producing a lateral binding force on said contact carrier block; and
      means abutting said pivot washers and preventing axial movement thereof with respect to said shaft so that said carrier block positioned between said pivot washers is reciprocated by corresponding movement of said shaft.

3. A variable resistance device comprising:
   a housing having sidewalls enclosing a cavity, said housing having a shaft opening in a sidewall thereof communicating with said cavity;
   a resistance element supported within said cavity;
   a contact carrier block mounted in said cavity for reciprocation in a path substantially parallel to said resistance element, said contact carrier block including an electrically conductive wiper extending to and adapted to traverse said resistance element;

an adjustment shaft extending through said shaft opening in said housing, said shaft having one end portion thereof within said housing relieved to provide a smaller cross section than the remaining portion thereof and forming a relatively flat shoulder between said end portion and said remaining portion of said shaft;

sealing means within said opening in said housing for sealing said opening between said shaft and said housing;

pivot means for pivotally attaching said shaft to said contact carrier block, said pivot means comprising:

a first bore formed in said carrier block coaxially with respect to said direction of reciprocation, said first bore adapted to receive said relieved end portion of said shaft therethrough;

a second substantially larger bore coaxially aligned with said first bore formed through a portion of said contact carrier block and forming a shoulder surface between said respective concentric bores;

a first and second pivot washers disposed on opposite sides of said first bore around said relieved end portion of said shaft extending therethrough and retaining said carrier block therebetween, said pivot washers having diametrically opposed pivot sections on opposite sides thereof permitting said shaft to pivot in any direction without producing a lateral binding force on said contact carrier block;

means on the end of said shaft retaining said pivot washer in position on said shaft adjacent the end of said carrier block;

a spool member disposed around said shaft between said shoulder surface formed between said respective concentric bores and said flat shoulder formed on said shaft, said spool member being retained within said second substantially larger coaxial bore within said carrier block and having an outer diameter adjacent said shoulder surface adapted to ride against the inner surface of said second larger bore, said spool having an inner hole substantially larger than said shaft but adapted to ride on said shaft adjacent said shoulder of said shaft; and a third pivot washer disposed between the end of said spool and said shoulder of said shaft thereby to permit said spool to pivot with respect to said shaft, said spool retaining said pivot washer adjacent said shoulder surface in said carrier block in abutting relationship between said end surface of said spool and said shoulder surface so that said carrier block positioned between said first and second pivot washers is forced to reciprocate by corresponding movement of said shaft.

4. A variable resistance device comprising:

a housing having sidewalls enclosing a cavity, said housing having a shaft opening in a sidewall thereof communicating with said cavity;

a resistance element supported within said housing;

a contact carrier block mounted in said housing for reciprocation substantially parallel to said resistance element, said contact carrier block including an electrically conductive wiper extending to and adapted to traverse said resistance element;

means defining an annular gland within said shaft opening formed in said sidewall of said housing;

an adjustment shaft extending through said opening in said housing, said shaft having outer dimensions less than the dimensions of said opening through said sidewall of said housing;

shaft seal means disposed around said shaft within said annular gland of said housing, said seal means comprising an annular ring of elastomeric material disposed around said shaft and including a pair of flat washers also disposed around said shaft on opposite sides of said ring so that said outer surfaces of said washers move in mutually contacting engagement with the sides of said gland as said shaft is moved laterally therein whereby said resilient sealing ring is retained in sealing relation around said shaft and between the respective inner surfaces of said washers; and pivot means for pivotally attaching said shaft to said contact carrier block, said pivot means comprising:

a bore formed in said carrier block coaxially with respect to said direction of reciprocation thereof, said bore having dimensions substantially greater than the diameter of said shaft and adapted to receive one end of said shaft therethrough;

at least one pair of pivot washers disposed on said end of said shaft on opposite sides of said bore through said carrier block and retaining said carrier block therebetween, said pivot washers each having pivot edges protruding from opposite sides thereof, said pivot edges being disposed substantially normal to each other on opposite sides of said respective washer thereby permitting said shaft to pivot in any direction without producing a lateral binding force on said contact carrier block; and means abutting said pivot washers and preventing axial movement thereof with respect to said shaft so that said carrier block positioned between said pivot washers is reciprocated by corresponding movement of said shaft.

References Cited

UNITED STATES PATENTS

| | | | |
|---|---|---|---|
| 2,831,094 | 4/1958 | Bourns et al. | 338—183 X |
| 2,857,497 | 10/1958 | Bourns et al. | 338—183 |
| 2,985,473 | 5/1961 | Parker | 227—95 X |
| 3,179,423 | 4/1965 | McCloud | 227—174 X |

RICHARD M. WOOD, *Primary Examiner.*

J. G. SMITH, *Assistant Examiner.*